United States Patent
Möller

(10) Patent No.: US 8,632,614 B2
(45) Date of Patent: Jan. 21, 2014

(54) AUTOTHERMAL METHOD FOR THE CONTINUOUS GASIFICATION OF CARBON-RICH SUBSTANCES

(75) Inventor: Roland Möller, Truchtlaching (DE)

(73) Assignee: ECOLOOP GmbH, Goslar (DE)

( * ) Notice: Subject to any disclaimer, the term of this patent is extended or adjusted under 35 U.S.C. 154(b) by 783 days.

(21) Appl. No.: 12/809,350

(22) PCT Filed: Dec. 22, 2008

(86) PCT No.: PCT/EP2008/010999
§ 371 (c)(1),
(2), (4) Date: Sep. 30, 2010

(87) PCT Pub. No.: WO2009/080336
PCT Pub. Date: Jul. 2, 2009

(65) Prior Publication Data
US 2011/0005136 A1 Jan. 13, 2011

(30) Foreign Application Priority Data
Dec. 20, 2007 (DE) .......................... 10 2007 062 414

(51) Int. Cl.
*C01B 3/36* (2006.01)

(52) U.S. Cl.
USPC ....................................................... 48/197 R

(58) Field of Classification Search
None
See application file for complete search history.

(56) References Cited

U.S. PATENT DOCUMENTS 3,736,247 A 5/1973 Jones et al.
4,032,305 A * 6/1977 Squires .............................. 48/73

(Continued)

FOREIGN PATENT DOCUMENTS

DE 43 26 484 3/1994
DE 43 09 493 9/1994

(Continued)

OTHER PUBLICATIONS

International Preliminary Report on Patentability and English translation of Written Opinion of the International Searching Authority for PCT/EP2008/010999, Aug. 3, 2010, The International Bureau of WIPO, Geneva, Switzerland.
International Search Report for PCT/EP2008/010999.

*Primary Examiner* — Imran Akram
(74) *Attorney, Agent, or Firm* — Stites & Harbison PLLC; Marvin Petry

(57) ABSTRACT

The invention relates to an autothermic method for the continuous gasification of substances (14) rich in carbon in a vertical processing chamber (100) having a calcination zone (C) and an oxidation zone (D), in which the calcinated substances rich in carbon oxidize with gas containing oxygen, wherein the gaseous reaction products are withdrawn at the top (G) of the vertical processing chamber (100). The vertical processing chamber is configured in the shape of a vertical shaft furnace (100), which is continuously flowed through from the top to the bottom by a bulk product (13) conducted in a cycle, which itself is not oxidized, wherein the substances (14) rich in carbon are added to the bulk product (13) before entering (3) the furnace, and the gas containing the oxygen is introduced in and/or beneath the oxidation zone (D), whereby the rising gas flow is facilitated. An after-cooling zone (F), in which the bulk product is cooled to below 100° C., is configured by introducing at least part of the gas containing the oxygen at the lower end (4) of the vertical processing chamber (100).

21 Claims, 2 Drawing Sheets

(56) References Cited

U.S. PATENT DOCUMENTS

Figure 1:
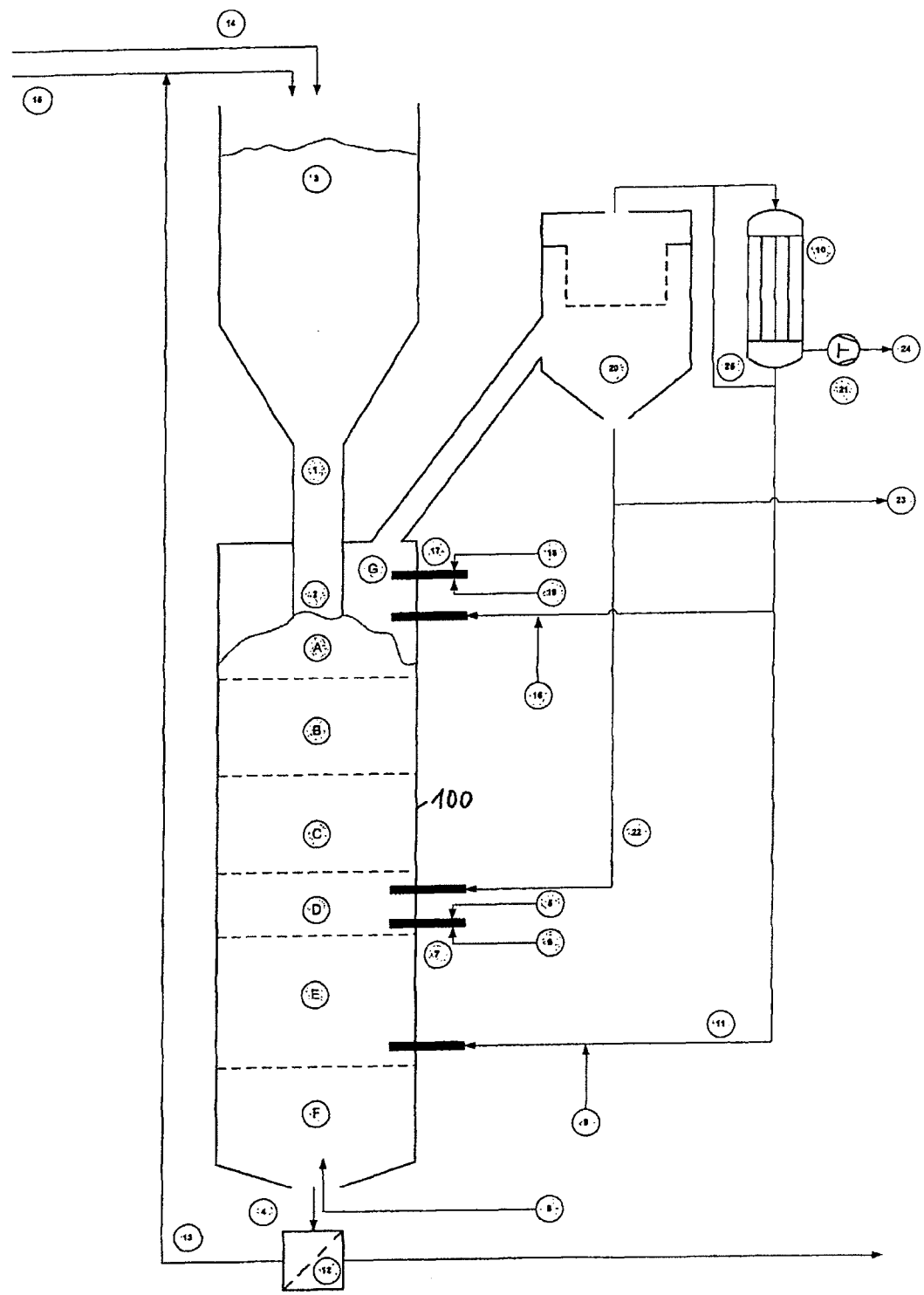

| | | | |
|---|---|---|---|
| 4,300,915 A | | 11/1981 | Schmidt et al. |
| 4,374,650 A | | 2/1983 | Garside |
| 4,488,398 A | | 12/1984 | Noguchi |
| 4,511,459 A | * | 4/1985 | Yan et al. ................ 208/127 |
| 4,758,248 A | | 7/1988 | Hillinger et al. |
| 5,064,444 A | | 11/1991 | Kubiak et al. |
| 5,346,515 A | | 9/1994 | Kubiak et al. |
| 5,439,491 A | | 8/1995 | Kubiak et al. |
| 5,776,212 A | * | 7/1998 | Leas ................................ 48/73 |
| 7,077,878 B1 | | 7/2006 | Muehlen et al. |
| 2002/0035804 A1 | * | 3/2002 | Garcia-Secovia et al. .. 48/197 R |

FOREIGN PATENT DOCUMENTS

| | | |
|---|---|---|
| DE | 44 27 860 | 2/1996 |
| DE | 196 09 721 | 9/1997 |
| DE | 197 55 693 | 7/1999 |
| DE | 100 31 501 | 1/2002 |
| DE | 101 42 290 | 3/2003 |
| DE | 103 30 512 | 3/2005 |
| DE | 10 2004 001 708 | 8/2005 |
| DE | 10 2006 023 259 | 11/2007 |
| WO | WO 96/00265 | 1/1996 |
| WO | WO 99/37739 | 7/1999 |

* cited by examiner

AUTOTHERMAL METHOD FOR THE CONTINUOUS GASIFICATION OF CARBON-RICH SUBSTANCES

The present invention relates to an autothermal method for the continuous gasification of carbon-rich substances in a vertical process chamber having a calcination zone and an oxidation zone, in which the carbon-rich calcinated substances are oxidized by means of an oxygen-containing gas, wherein the gaseous reaction products are drawn off at the top of the vertical reaction chamber, the vertical process chamber is embodied in the form of a vertical shaft kiln, through which a bulk material, which itself is not oxidized, continuously flows in a cycle from the top to the bottom, and the carbon-rich substances are added to the bulk material prior to the entrance to the kiln.

Such processes have been known for a long time and are executed in counterflow gasifiers, for example, in which the process gases being generated, but also a biomass, which is moved to the bottom of the gasifier, move in a counterflow around the coal products. The process gases being produced can be directly burned, or used for synthesizing processes. In connection with the described method it is disadvantageous that, although it can be executed autothermally, the process gasses are largely dependent on the respectively supplied carbon-rich substances, and that accordingly the method is difficult to control. The method is completely unsuitable in connection with contaminated carbon-rich substances such as, for example, fluorine- and chlorine-containing plastics, contaminated waste materials, medicaments, or the like.

Already known is the use of residue and waste materials in electric low-shaft kilns, in which the production of calcium carbide, ferro-silicone, ferro-chromium, and the like, can be designed to be more advantageous in regard to energy at very high temperatures. However, such a method is not autothermally operated, instead a considerable use of energy by means of self-combusting or self-baking hollow electrodes is needed for generating the high required temperatures. Such a method is described in DE 10 2006 023 259 A1, for example, and is directly linked to the production of the above mentioned materials.

The method of the type mentioned at the outset is also employed for coal gasification, in which case the formation of a calcination zone can be omitted as a rule when coal is used.

In principle, allothermal methods are also known for the gasification of carbon-containing substances and are dependent on an external energy supply, as in the previously mentioned document. Fluidized bed reactors are often used for executing allothermal gasification processes, such as are known, for example, from DE 36 35 215. The large technical outlay for the generation of the required secondary energy independently of the method for keeping the fluidized bed stable is disadvantageous, as well as the difficult control of the specific physical demands made on the materials employed, such as, for example, density, conveying behavior, floating behavior and particle size. The employment of rotary reactors, such as described in DE 28 44 741, is known in connection with the allothermal method. Because of the short lingering time of the reaction gases in the rotary reactor, no optimal gas equilibrium can occur, and considerable portions of low-grade gases are created.

In principle, autothermal gasification processes are advantageous, which provide gases rich in carbon monoxide and whose hydrogen portion is determined by the hydrogen content of the carbon carrier used, and possibly by metering water into the gasification process, and which can be regulated, if needed. The heat energy required for gasification is obtained here from the partial oxidation of the raw materials used.

The employment of fluidized bed reactors is also known in connection with autothermal methods, for example from DE 44 27 860. It is attempted there to distribute the carbon carrier as finely as possible and to oxidize it in the gas phase in order to achieve the complete transformation into carbon monoxide. To this end, an elaborate diminution process of the carbon carriers is necessary, in which case a use of material flows containing plastics is not possible, because these tend to stick together or to form droplets in the gas phase.

Because of the short lingering times of the gases, the use of the rotary reactor technology in connection with autothermal gasification processes is very difficult and requires elaborate reactor structures, such as are known, for example, from DE 32 16 836 C2.

For example, installations for autothermal gasification are disclosed in DE 32 41 169 C2, but as a rule they do not permit the use of plastic-containing waste, for example. To make the latter possible, different processes have been proposed, for example in DE 196 09 721 and DE 43 26 484 which, however, lead to problems in the area of the plastic material supply to the reactor, reactor displacents because of molten adhesions and residue which cannot be gasified, considerable creation of oil and tar in the produced gas, extensive outages for cleaning purposes, formation of dioxins and furans, and corrosion by of chlorine, or respectively hydrogen chloride.

The gasification of organic matter in several stages in back-to-back-connected reactors which, for example, is known from DE 199 45 771 C1 or DE 197 55 693 C1, employs a heat-carrying medium. These multi-stage methods require an elaborate heat-exchange system, and the emissions associated with the process limit the use of material qualities because of heavy metal contents and other emission-relevant noxious materials. Finally, it is also already known to gasify carbon-containing substances in a fixed bed in order to subsequently perform a post-gasification under high pressure in a flue-flow reactor. By means of this it is also possible to process chlorine-containing flows, for example with a high PVC proportion, and carbon carriers of a high degree of contamination, such as heavy metals, for example, or other noxious materials. Such a gasification process is described, for example, in DE 100 31 501 A1, in which case a disadvantage again lies in the extensive pre-treatment of the material, which is separately described, for example, in DE 101 42 290 A1. The large technical outlay is also documented, for example, by means of special solutions for product feeding and the prevention of raw gas fluctuations (in this connection, see DE 10 2004 001 708 A1) or the avoidance of deposits in the raw gas area (see, for example, DE 103 30 512 A1).

Furthermore, an elaborate quenching system was required for neutralizing hydrogen chloride in order to avoid corrosive damage to the installation, see DE 43 09 493 C2 in this connection.

A method of the type mentioned at the outset is known from AT 387 786 B. An inert bulk material is there conducted in a cycle through the shaft. The bulk material is intentionally returned at a high temperature in order to make drying in the separate drying installation possible. The high residual heat of the bulk material removed from the kiln prohibits the employment of certain carbon-rich materials, such as, for example, any kind of plastic materials, because these would glue together the bulk material prior to entry into the kiln and would interrupt the flow of the bulk material. Also, non-controllable premature reactions and a corresponding formation of noxious materials would have to be expected. The method is executed in several spatially separated areas, so that appropriate transport arrangements for moving the bulk material are required, and the control over gaseous byproducts is made more difficult.

The object of the instant invention lies in the improvement of a method of the type mentioned at the outset in such a way, that it reacts insensitively to the employment of different qualities of the carbon-rich substances without an essential increase in the outlay.

In accordance with the invention, the object is attained by means of a method of the type mentioned at the outset, in accordance with which the oxygen-containing gas is introduced, at least in part, below the oxidation zone, by means of which the rising gas flow is conveyed, while below the oxidation zone the bulk material and the ash products are cooled down to 450° C. in a waste heat zone, and furthermore the oxygen-containing gas is introduced at least partially at the lower end of the vertical shaft kiln and, for a recovery of energy, is cooled down to a characteristic temperature below 100° C. in a post-cooling zone below the waste heat zone in a counterflow prior to being removed from the kiln.

It has been shown that by mixing the carbon-containing substances with an essentially inert bulk material, and by conducting this mixture of bulk material and carbon-containing substances through a vertical shaft kiln by the action of a counterflow of a rising gas, the carbon-rich materials can be autothermally gasified without particular demands being made on the quality of the carbon-containing materials being employed. It is merely necessary to assure that the amount of supplied carbon-containing substances is sufficient for maintaining the autothermal equilibrium in the vertical shaft kiln. It has been shown that carbon-rich substances with edge lengths of up to 40 cm can be added without the course of the process being hindered.

The bulk material is of particular importance for the course of the process, since for one it takes on the function of a heat-conducting material. It furthermore functions as a transport medium which conveys the carbon-rich substances for their final gasification as far as the oxidation zone, and thereafter conveys the gasification residue in the form of ash so it leaves the lower end of the vertical shaft kiln. Here it is of further importance that a bulk material is gas-permeable and in this way permits the rising gas flow to pass through, by means of which a heat exchange between the bulk material as the conveying medium and the rising gas flow results in the individual reaction zones.

For the recovery of energy and cooling of the bulk material and the ash portions below the oxidation zone, the bulk material flow is cooled down to a characteristic temperature of approximately 450° C. in a waste heat zone by direct cooling with oxygen-containing gas, and in case it is intended to supply water to the process, this preferably takes place in the area of the waste heat zone, so that the steam being generated rises and participates in the synthesis reaction in the area of the oxidation zone.

For improving the energy balance and to simplify handling of the bulk material to be removed from the lower portion of the vertical shaft kiln, the oxygen-containing gas is supplied, at least partially, at the lower end of the vertical shaft kiln, so that the bulk material is cooled down in a counterflow to a characteristic temperature of below 100° C. in a post-cooling zone below the waste heat zone, prior to being removed from the kiln. Because of this it is easily possible to also supply temperature-sensitive plastic, bitumen, oil-contaminated soil, or the like to the bulk material prior to the renewed entry into the kiln, without these materials uncontrollably reacting at the beginning, or hindering the bulk material flow by sticking together.

Finally, purely mechanical properties of the bulk material play a role, wherein the grain size preferably should not be larger than 20 cm, and particularly preferred lies in a range between 1 and 8 cm. The granulation of the bulk material prevents the gluing or baking because of mechanical shearing, even of plastic-containing substances, so that the complete gasification of all supplied carbon-containing substances is achieved in the oxidation zone.

Mineral, ceramic or metallic materials of the above mentioned grain size, and/or mineral calcinates, such as for example CaO, are employed, at least in part, as the bulk material, but also pre-stages of the calcinates, such as limestone, for example. CaO has the advantage of also being suited for binding halogens contained in the flow of materials, which react with the calcium and occur as harmless chlorides or fluorides. To this end it is particularly preferred to form a portion of the bulk material to have a grain size of less than 2 mm, wherein these small particles rise, at least in part, with the gas flow and, if required, can be filtered out at the top of the vertical shaft kiln. All of the dust being created, or a part of it, can also be returned to the bulk material cycle. When employing limestone as the bulk material, the temperature in the oxidation zone is preferably set so low that a complete burning of the limestone does not occur, but only the formation of a thin CaO layer on the limestone elements, so that the capability of bonding of the halogens remains assured without large amounts of CaO being generated. Limestone itself has an increased mechanical load-bearing capacity in regard to CaO.

As a rule, possible heavy metals entering the process in the form of a contamination of the flow of material can remain in the cycle of the bulk material, but if concentrated in the filter dust, partial flows can be transferred out of the process and disposed of.

The capability of bonding halogens by means of CaO to limestone, even in the form of a thin layer, and to remove heavy metals in a controlled manner by means of the bulk material, also permits a special design of the method as a disposal process for plastics which are critical in this regard, such as for example PVC, but also contaminated wood materials, bitumen, oil-contaminated soil, foil flakes, light shredder fractions in the form of residue from automobile recycling, and the like.

Depending on the type of the carbon-rich substances being employed, in a further development of the invention the bulk material flow is first dried in a counterflow in a drying zone above the calcination zone with the aid of the rising gases while being heated to a characteristic temperature of 20 to 100° C., and subsequently pre-degasified in a pre-degasification zone while being further heated to a characteristic temperature of 100 to 450° C. until it reaches the calcination zone.

As mentioned, the rising gas flow provides the energy required for drying and pre-gasifying, and, in the process, is cooled in a counterflow to lower temperatures before it is drawn off at the top of the vertical shaft kiln.

Heating of the flow consisting of bulk material and carbon-rich substances to a characteristic temperature of up to 1,200° C. then takes place in the calcination zone.

Depending on the carbon-rich substances supplied and the desired composition of the gaseous reaction products, it can also make sense to supply water directly in the oxidation zone.

In a particularly preferred embodiment of the invention, after it has been drawn off at the top of the vertical shaft kiln, the gas being produced is further processed in a flue stream post-gasification zone in the presence of water vapor.

The drawn-off gas consists of a gas mixture of the gas being generated in the oxidation zone, at least CO and $H_2$, and gas from the pre-degasification zone, in which case soot can also be mixed in with the gas, besides the gaseous hydrocarbon compounds. When employing air as the oxidation gas, the gases being generated also contain a relevant nitrogen portion. The soot is due to the fact that in the pre-degasification zone a disintegration of the hydrocarbon compounds already starts at a comparatively low temperature, but that the temperatures, or respectively retention times obtaining there, are insufficient for making possible the complete disintegration into the ideal reaction gases CO, $H_2$ and hydrocarbon of a chain length of less than $C_4$. The still existing longer-chain hydrocarbons are then decomposed by the flue stream post-stream gasifier, so that thereafter an ideal synthesis gas of CO, $H_2$ and hydrocarbons of a chain length of less than $C_4$ results as the end product of the process. This synthesis gas can be employed in a multitude of application knowns per se. Cited as an example burning in a combustion chamber should be cited, in which the hot gas being generated can be employed for driving hot gas turbines and/or steam turbines for the generation of electricity, and/or the steam as a heating medium in thermal processes. The synthesis gas can be cleaned by filtration and/or gas cooling and can be employed as the heating gas in thermal processes, for example for firing calcination shaft kilns and/or for use in gas motors. Here a great advantage lies in that the synthesis gases can also be generated from a biomass, and that by means of this the $CO_2$-balance can be significantly improved, for example when producing lime, while up to now it was only conditionally possible to employ biomass of defined properties.

Cleaned-up synthesis gas is also suitable for being split into its components by means of partial liquefaction, in which case the pure components contained in the gas can also be obtained by means of the application of pressure-change adsorption technology. Finally, the cleaned-up synthesis gas, or one of its components, can also be employed, either altogether or partially, for the synthesis of chemical basic or intermediate products, independently of the type of which starting material had been supplied to the process as the carbon-containing substance.

The mentioned presence of steam in the flue stream post-gasifier zone is achieved by the addition of water or steam, or by the steam escaping in the drying zone.

The process can easily take place at pressures approaching the ambient pressure, in which case a pressure spectrum in the range of −200 mbar to 1,000 mbar (ü) has shown to be particularly practical. It is particularly advantageous within the framework of the process to generate an underpressure in the vertical shaft kiln, which prevents gaseous end or intermediate products from escaping from the vertical shaft kiln even without elaborate seals, for example in the area of the supply lines or control organs. The underpressure can be provided by a suction arrangement, for example, which is also employed for drawing off the gaseous reaction products.

All process zones, from drying to post-cooling, are advantageously located in a single chamber, so that no transport devices are required between the zones. For feeding in the material, a water-cooled gravity chute without fittings and movable parts is preferably arranged on the top of the vertical shaft kiln. Additional emission locations, such as can be required with other methods for conditioning the materials participating in the process as bulk material, reactants or involved materials can be omitted.

To prevent carbides from forming in the oxidation stage when CaO is used as the bulk material, the temperature regulation of the process advantageously lies below 1,800° C.

Preferably, oxygen-containing gas and/or fuel are purposely added in the oxidation zone. This takes place at startup, i.e. when the process is started, but also for controlling the position, size and temperature of the individual zones in the vertical shaft kiln. It is possible by means of this to prevent that individual zones wander, that the temperature level of the process reaches unfavorable values, or that the edge zones overheat and thus dissipate, because of which the process would be interrupted. However, in the ideal case a fuel addition is not necessary.

Figure 2:
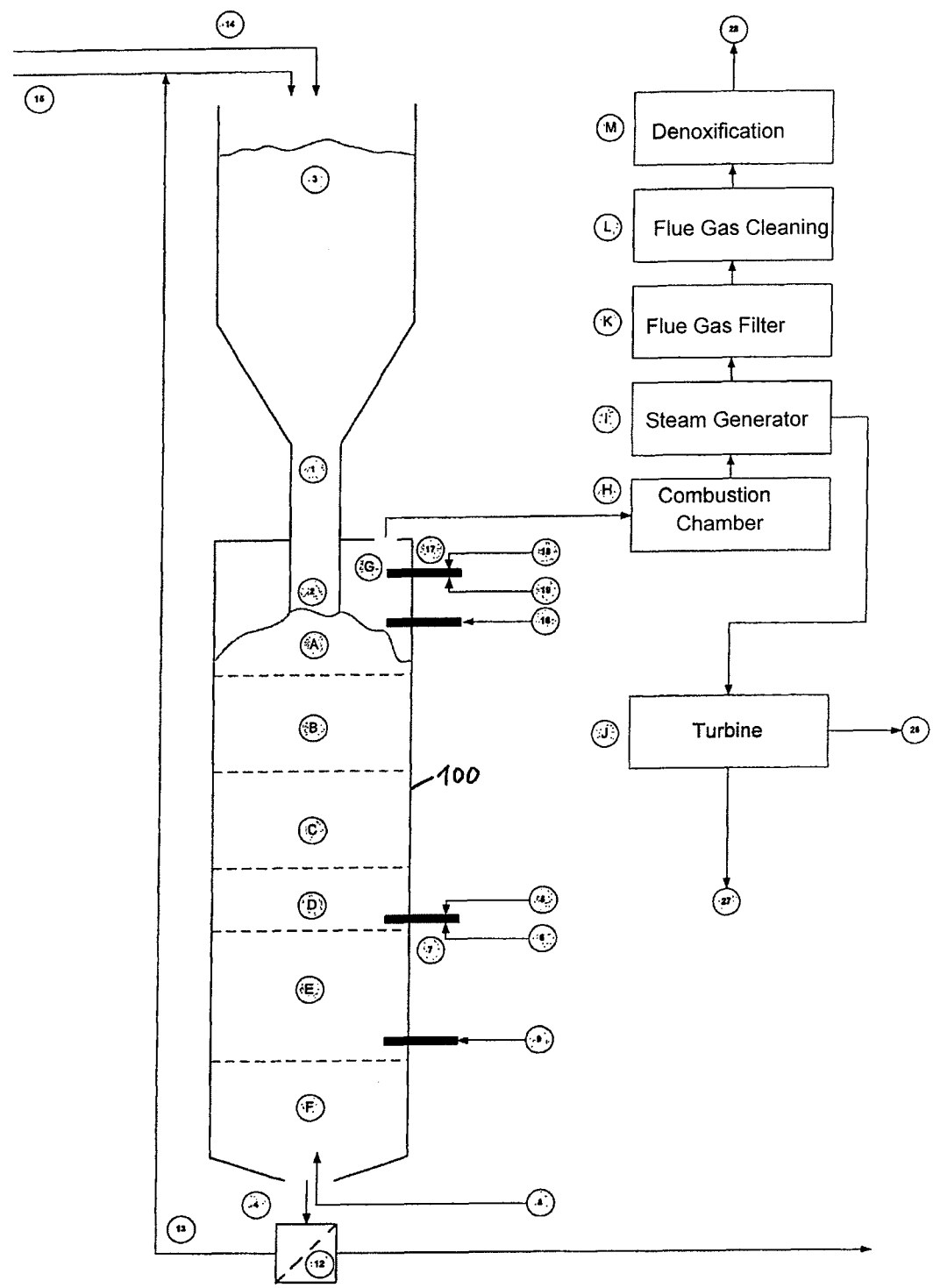

In what follows, an exemplary embodiment of the invention will be covered in greater detail by making reference to the attached drawings. Shown are in:

FIG. 1, a schematic representation of a vertical shaft kiln for gasifying carbon-rich substances;

FIG. 2, a schematic representation of the vertical shaft kiln in FIG. 1 with a downstream-connected use of the process gas.

FIG. 1 shows a schematic representation of a vertical shaft kiln 100 which, in its structure, essentially corresponds to a calcining shaft kiln such as is used on a large technical scale in combustion and sintering processes. In the execution of the present method it is employed as a gasification reactor. To this end the kiln is continuously charged with a mixture of carbon-rich substances and an incombustible bulk material. The operation of the gasification reactor is set in such a way that the process is run autothermally by means of the oxidation of the carbon-rich substances employed, and the oxidation can be aided by a constant load furnace 5, 6, 7, in particular for the start-up of the process.

In connection with the represented exemplary embodiment, the vertical shaft kiln, or respectively gasification reactor 100, is controlled in such a way that gasification occurs in seven different process zones. Following entry into the kiln 100 via a bulk material column 1, the carbon-rich materials mixed together with the bulk material first reach a drying zone A, in which they are dried at a characteristic temperature of from 20 to 100° C. They subsequently reach a pre-degasification zone B, in which they are relieved of volatile components by de-gasification at a characteristic temperature of 100 to 500° C. Thereafter, by means of the action of the downward-moving bulk material, which inter alia is used as a heating and transport medium, the pre-degasified carbon-rich substances reach a calcination zone C, in which heating to a characteristic temperature of up to 1,200° C. takes place, before any still present carbon is gasified in the following oxidation zone D by supplying oxygen-containing gas at temperatures below 1,800° C. After leaving the oxidation zone, the incombustible bulk material, together with the ash portions, is cooled down to approximately 450° C. in a waste heat zone E by direct cooling with oxygen-containing gas and/or the introduction of water, if required, with steam being generated, while previously the oxygen-containing gas had been heated up underneath the waste heat zone in a post-cooling zone F in counterflow with the bulk material which, on the other hand, for the return of energy, is cooled down to below 100° C. by the counterflow of oxygen-containing gas introduced into the bottom area of the vertical shaft kiln.

The feed-line 8 for the oxygen-containing gas at the bottom of the vertical shaft kiln 100 also represents the start of the gaseous counterflow, which extends through all previously described process zones.

As already mentioned, in the process the oxygen-containing gas is initially heated to more than 450° C. in the post-cooling zone F and in the waste-heat zone E, which follows in the sense of the gas movement direction, prior to accomplishing the oxidation of the carbon compounds, or of the carbon present in pure form, in the oxidation zone, if required with a further direct supply of oxygen-containing gas. In accordance with the temperature in the oxidation zone D, the reaction gases continue to rise up and in the calcination zone C provide the temperature level required there. Thereafter the reaction gases flow through the pre-gasification zone B and, while being further cooled, through the drying zone A where, after exiting at the upper end of the bulk material column, the gas is represented in the form of a gas mixture of synthesis gas CO and $H_2$ from the oxidation stage, steam and hydrocarbons, in particular from the pre-degasification stage B and, in unfavorable cases, can contain, besides dust, also soot, which is the result of disintegration processes in the pre-degasification zone B. To increase the quality of the reaction gases, a flue stream post-degasification zone G is provided in the upper reactor portion, in which the dust- and soot-containing gas is thermally after-treated at temperatures of 500 to 1,000° C. while supplying oxygen in the presence of water vapor, so that it can be made available as qualitatively highly valuable raw synthesis gas for use as a material and/or thermally.

By mixing the carbon-rich substances with an incombustible piece material it has been shown that the seven described zones are formed in the course of the continuous passage through the vertical shaft kiln 100, which makes possible the gasification of an extremely broad spectrum of the most diverse carbon carriers in a moderate pressure range between −200 mbar up to 1,000 mba (o). While up to now only highly pure carbon carriers, such as, for example, coke, coal, petroleum coke, anthracite or waste oil, could be employed in gasification processes, the use of bulk material as heat and transport medium in particular also permits the employment of organic materials, whose melting points or softening points lie in the range above 20° C. and below 500° C. Among these are also carbon compounds with polymeric structures, in which the novel method very strongly impedes the formation of oily or tar-like splitting products by means of the directed control of the characteristic temperature of the material, or respectively of the products of splitting. Also, no emission sources result because of the autothermal process method by means of partial oxidation, so that the use of contaminated carbon-rich substances with, for example, increased heavy metal contents, such as result in connection with lacquered wood, for example, is made possible.

As already mentioned, CaO in particular is suitable as the bulk material, which is provided in a grain size of at most 20 cm, while the grain size range between 1 and 8 cm has shown to be particularly advantageous. The bulk material of this grain size is not only used as a heating and transport medium, but by means of its mechanical properties it also sees to it that the carbon-rich substances do not clump or bake together while moving through the vertical shaft kiln 100. The mechanical abrasion of the grains, which are continuously in movement in relation to each other, sees to this.

When using CaO, the bulk material also offers the further advantage that it is available as a reaction partner, for example for halogens, and in this respect counteracts the formation of dioxins, furans, or the like. The formation of these toxic substances is also counteracted because there is no oxygen present as a reaction partner in the temperature range which is critical for the formation of these substances. Here it is particularly advantageous to admix a portion of fine material, whose grain size lies in an order of magnitude of approximately less than 2 mm down into the micrometer range, to the bulk material. Such fine material has a very large reactive surface and is partially present in the form of dust in the reaction gases, and it can easily be filtered out of them.

Moreover, the bulk material is removed at the bottom of the vertical shaft kiln 100 and, by means of a circular conveying arrangement 13 is returned back to the vertical shaft kiln 100, along with the provision of fresh carbon-rich substances 14. In this area it is also possible to remove fine materials, for example by filtering.

While up to now the gasification of polymers, in particular contaminated polymers, has been problematical, since a particularly careful sealing of fittings was required because of the increased pressure, the described method is advantageously performed at a slight underpressure, preferably in a range up to −200 mbar, in case of overpressure ideally not above 1,000 mbar. In connection with underpressure it is possible to achieve sealing in that charging of the reactor takes place via the bulk material column 1 which, because of static weight rests on the reactor bed and therefore connectedly communicates with the reactor filling 2 without any further fittings. Following the already mentioned admixture of the carbon-rich substances to the bulk material, the latter is initially conducted to a bulk material collecting main 3. Because of the continuous removal of the incombustible bulk material at the reactor bottom 4, material continuously passes through it. Thus, the mixture of incombustible bulk material and carbon-rich substances automatically slides out of the bulk material collecting main 3 into the reactor, without fittings or other technical control arrangements being required for this. The height of the bulk material column has been selected to be such that it assures the sealing of the reactor gas phase through the bed against the atmosphere by means of its own loss of pressure. In this case the operation of the reactor under underpressure is of particular advantage, because the escape of reactor gas is prevented.

The introduction of thermal energy essentially takes place in the oxidation zone D, in which the mentioned basic output is introduced into the bulk material by metering oxygen 5 and fuel 6, such as, for example, heating oil, natural gas or cleaned synthesis gas from the instant process, via burner lances 7 as a direct heating system. However, the essential energy introduction is created by the partial combustion of the previously calcinated carbon-rich substances in the bulk material and by metering oxygen, or even plain air, over the reactor bottom 8. The task of the base load burners 7 consists in assuring the dependable ignition of the reaction partners in the oxidation zone D.

The generated hot gases, which essentially consist of carbon monoxide, but also of hydrogen, flow upward through the reactor bed from the oxidation zone D and are used as energy carriers for heating the process zones formed above the oxidation zone D.

As already mentioned, the carbon-rich substances which actually are mainly moist with water, are heated in the drying zone A to a characteristic temperature of 100° C., while the water they contain is evaporated and while the thermal splitting of polymeric, or respectively of organic components, takes place in the following pre-degasification zone B. Because of the amount of energy required for splitting, the increase in the characteristic temperature of the material is here limited to approximately 450° C. In this zone the hot gases from the zones located below mix with the gases from the thermal splitting being generated in the process.

Oxidation in the oxidation zone D is controlled in such a way that the complete oxidation of the still not gasified carbon into carbon monoxide is assured. This control takes place primarily by the directed setting of the throughput amount via the continuous bulk material removal at the reactor bottom 4, but if required also by adjusting the base load burner at 7 or a change in the proportions of carbon-rich substances in the bulk material collecting main 3.

To the extent that a supply of water is desired, a water supply device at 9 is preferably provided in the area of the waste head zone E, where the water is converted into hot steam at temperatures above 450° C. and is supplied to the oxidation zone D by means of an upward flow. The hot bulk material flow from the oxidation zone D is cooled off in a counterflow.

In place of supplying fresh water, it is also possible to supply the condensate mixture being produced in a gas cooling device 10, which essentially consists of water and small amounts of higher-molecular organic compounds. These compounds do not interfere with the course of the process, but would make the disposal of the condensate mixture more difficult.

The already mentioned efficient energy return is realized via the waste heat zone E and the post-cooling zone F, while the incombustible bulk material is cooled down sufficiently far, so that ash portions and fine materials can be separated by means of a filter arrangement at 12 or other separating device. The already mentioned circular conveyance at 13 of the coarse bulk material takes place along with the admixture of fresh carbon-rich substances 14 via the bulk material collecting main 3. Losses of coarse bulk material, for example caused by mechanical abrasion, are compensated by metering in fresh coarse bulk material at 15.

In the upper portion of the vertical calcining shaft kiln the gas from the oxidation zone D and the gas from the pre-gasification zone B are mixed together into a dust- and soot-containing gas mixture, which undergoes a thermal post-treatment in the flue stream post-gasification zone at temperatures of 500 to 1,000° C. in the presence of water vapor. The required water vapor can be introduced in a directed manner by means of a dosing device 16, but can also be generated by the use of moist carbon-rich substances in the drying zone A and can be utilized by an upward flow in the flue stream post-degasification zone G.

A gas burner 17 is provided for setting an optimal temperature range in a constant manner in this zone. It can be operated with an excess of oxygen-containing gas 18, related to the fuel portion 19 in the burner 17 in order to assure an after-gasification of soot particles and other fine organic particles in the synthesis gas.

Depending on the intended use of the synthesis gas, different process steps can be taken for the further treatment of the gas after it has left the flue stream gasification zone. Assuming that cleaned synthesis gas is intended to be used, for example, as a marketable heating gas, as a material basis for further chemical uses or similar applications, an efficient removal of dust and condensates is required. The removal of dust takes place by filtration at 20 of the hot synthesis gas at a temperature of 300 to 600° C., where, by means of a gas blower 21, the gas/dust mixture is drawn out of the flue stream gasification zone G via a temperature-resistant filter system 20. The already previously mentioned underpressure can also be generated in the installation with the aid of the gas blower 21.

The filtered-out filter dust can still contain non-gasified soot portions, which are utilized by a partial return device 22 of the filter dust into the oxidation zone D. Due to the method, a plurality of accompanying materials from the employed carbon-rich substances is bonded by adsorption to the filter dust (for example heavy metals), and/or by reaction (for example in the form of halogens), so that the filter dust constitutes a desired sink for noxious materials in the method of the invention. When using appropriate carbon-containing substances it is therefore necessary to provide a removal at 23 of a partial filter dust flow from the process, which must be disposed of.

Directly following the hot gas filtration, the synthesis gas is freed, preferably by cooling to temperatures below 50° C., of condensates, such as water and small portions of higher-molecular organic splitting products, before it is made available for further use (at 24). The condensates resulting from this essentially consist of water stemming from the residual moisture in the carbon-rich substances used and from the partial burning of hydrogen. The condensates furthermore still contain small portions of higher molecular organic compounds (pyrolysis oils). This condensate mixture must either be disposed of or, as already described above, it can be returned again (at 11) into the process as reaction water and carbon carrier. It is possible to achieve a further advantageous process type by continuously returning a portion of the condensate mixture as a quenching medium to the head of the gas cooling device (at 25), by means of which efficient gas cooling is achieved and wall deposits in the gas cooling device are prevented at the same time.

In principle, a synthesis gas cleaned up in this way can also be split into its components by means of air disaggregation installations or pressure-change adsorption technology, and/or it can be employed as the fuel for use in gas motors.

If the quality of the used carbon-rich substances permits the direct combustion of the synthesis gas being generated without gas filtration and cooling, the synthesis gas created in the flue stream gasification zone can also be employed for direct electrical current generation and/or steam generation. This type of process is represented in FIG. 2, in which the synthesis gas is conducted without further treatment out of the flue stream gasification zone G directly into a combustion chamber H and is burned without any further pre-treatment. The energy content of the hot gases being created is thermally used for the generation of high pressure steam in a steam generator I. The steam is expanded via a steam turbine J and is converted to electrical energy at 26. The remaining steam can be further thermally used at 27 as a heating medium on the low-pressure side of the turbine.

The flue gas from the steam generator does still contain essential dust portions, which are separated via a flue gas filtration device K. Depending on the degree of contamination, or respectively on the quality of the carbon-rich materials used, the flue gas is then also conducted, if required, through a flue gas cleaning device L and/or denoxification device M in order to meet the environmental requirements regarding emissions into the atmosphere required by law.

The following exemplary embodiments are intended to explain the present invention, but do not limit it.

EXAMPLES

A total of six examples will be described, which differ from each other by the employment of different carbon-rich substances, while the execution takes place in a standardized manner. These different employed materials, qualities and the results found in connection with this are represented in detail in the following tables 1 to 4.

A calcium shaft kiln of a clear diameter of 2.2 m and a shaft height of 14.1 m is operated by means of a heavy heating oil through burner lances as the basic heating device in the oxidation zone. Calcined lime with a grain size of 0.5 to 6 cm was employed as the incombustible bulk material and was conducted in a continuous mass flow (see table 1, column c) through the lime shaft kiln from the top to the bottom, while the carbon-rich substance (see table 1, column a) was admixed to this cyclic flow prior to entry into the upper kiln area in the form of a continuous mass flow (see table 1, column b). The basic heating device (see table 1, columns d and e) was adjusted in such a way that a gas temperature of 600 to 700° C. occurred at the gas outlet of the calcium shaft kiln. In the further course of metering, sufficient air was continuously metered in across the reactor bottom 1 (see table 1, column g) until almost carbon-free ash was continuously obtained at the reactor exit. The resulting gas was conducted over a heating gas filtration device at a gas temperature of 450° C. and was subsequently cooled to 30° C. by means of a gas cooling device.

The condensate mixture resulting in the gas cooling device, which essentially consisted of water and slight amounts or organic oils, was temporarily buffered.

As a function of the composition of the carbon-rich substances used, a sufficient amount of water was continuously metered into the oxidation zone, so that a complete gasification of the initial carbon load was assured. The temporarily buffered condensate mixture and additional fresh water were used for this (see table 1, column f).

TABLE 1

Amounts Used (continuous metering)

| Example | (a) Carbon-rich substance Origin | (b) t/h | (c) Incombustible bulk material t/h | (d) Base heating Heavy heating oil t/h | (e) Air TNm³/h | (f) Water to oxidation zone t/h | (g) Air TNm³/h |
|---|---|---|---|---|---|---|---|
| 1 | Lignite | 5.0 | 10 | 0.05 | 0.557 | 0.61 | 5.875 |
| 2 | Hard coal (fat coal) | 5.0 | 10 | 0.09 | 1.031 | 1.51 | 10.871 |
| 3 | Anthracite | 5.0 | 10 | 0.12 | 1.339 | 1.50 | 14.111 |
| 4 | DSD mixed plastics | 3.75 | 15 | 0.16 | 1.755 | 0 | 6.861 |
| 5 | DSD sorted residue | 3.75 | 15 | 0.14 | 1.56 | 0.06 | 6.098 |
| 6 | Waste wood | 5.0 | 10 | 0.05 | 0.557 | 0.40 | 2.508 |

The composition and quality of the carbon-rich substances employed in the exemplary embodiments 1 to 7 can be taken from Table 2 and columns a to e.

TABLE 2

Qualities of the Carbon-rich Substances

| Example Origin | Carbon-rich substance | (a) HU [kw/kg] | (b) C-content [%] | (c) Ash [%] | (d) Moisture [%] | (e) Chlorine [%] |
|---|---|---|---|---|---|---|
| 1 | Lignite | 7.50 | 52.5 | 6.9 | 10.5 | 0.01 |
| 2 | Hard coal (fat coal) | 7.96 | 73.5 | 9.1 | 1.1 | 0.05 |
| 3 | Anthracite | 9.11 | 80.0 | 7.0 | 7.0 | 0.1 |
| 4 | Mixed plastics | 9.11 | 75.8 | 5.3 | 3.5 | 1.0 |
| 5 | DSD sorted residue | 6.99 | 58.2 | 11.2 | 9.2 | 1.7 |
| 6 | Waste wood | 4.04 | 39.9 | 4.8 | 18.3 | 0.2 |

The gas being generated in accordance with the exemplary embodiments was detected downstream of the gas cooling device through a measurement of the amounts of gas and was analyzed by means of an on-line thermal value analysis device. The average amount of gas flow is represented in table 3, column a, and the lower heating value in table 3, column b. Furthermore, the resulting flow amounts of the aqueous condensation phase of the gas cooling (table 3, column c), and those of the oil phase (table 3, column d) were calculated. The resulting ash was continuously screened out of the rough bulk material downstream of the reactor outlet, and the fine portion (grain size <3 mm) was recorded. The recorded mass flow is represented in table 3, column e.

TABLE 3

Resultant Mass Flows

| | (a) Amount of gas [TNm³/h] | (b) HU Gas phase [kW/m³] | (c) H₂O phase [t/h] | (d) Oil phase [t/h] | (e) Ash [t/h] |
|---|---|---|---|---|---|
| 1 | 13.05 | 1.83 | 0.53 | 0 | 0.80 |
| 2 | 18.52 | 1.51 | 0.06 | 0 | 0.96 |
| 3 | 22.55 | 1.36 | 0.35 | 0.002 | 0.85 |
| 4 | 14.67 | 2.61 | 0.13 | 0.011 | 1.06 |

TABLE 3-continued

Resultant Mass Flows

| | (a) Amount of gas [TNm³/h] | (b) HU Gas phase [kW/m³] | (c) H₂O phase [t/h] | (d) Oil phase [t/h] | (e) Ash [t/h] |
|---|---|---|---|---|---|
| 5 | 13.10 | 2.52 | 0.35 | 0.008 | 1.31 |
| 6 | 8.852 | 1.91 | 0.92 | 0 | 0.74 |

The gas being generated in accordance with the exemplary embodiments was analyzed downstream of the gas cooling device for its composition by means of an on-line analysis device. The gas compositions are represented in table 4, columns a to e.

TABLE 4

Resultant Gas Compositions

| Examples | (a) CO [Vol %] | (b) H₂ [Vol %] | (c) N₂ [Vol %] | (d) CO₂ [Vol %] | (e) KW < C₄ [Vol %] |
|---|---|---|---|---|---|
| 1 | 22.9 | 24.3 | 39.3 | 3.7 | 4.8 |
| 2 | 21.2 | 22.0 | 51.3 | 3.4 | 1.7 |

TABLE 4-continued

Resultant Gas Compositions

| Examples | (a) CO [Vol %] | (b) $H_2$ [Vol %] | (c) $N_2$ [Vol %] | (d) $CO_2$ [Vol %] | (e) $KW < C_4$ [Vol %] |
|---|---|---|---|---|---|
| 3 | 19.6 | 19.1 | 54.6 | 3.2 | 1.5 |
| 4 | 19.4 | 18.2 | 46.9 | 1.5 | 12.9 |
| 5 | 19.6 | 16.7 | 46.6 | 1.4 | 12.5 |
| 6 | 22.8 | 23.7 | 27.6 | 4.4 | 3.6 |

The invention claimed is:

1. An autothermal method of continuous gasification of carbon rich substances, comprising the steps of:
   using a vertical process chamber having a calcination zone and an oxidation zone,
   calcinating the carbon rich substances in the calcination zone,
   oxidizing calcinated carbon rich substances by an oxygen containing gas,
   drawing off the gaseous reaction products at the top of the vertical process chamber, the vertical process chamber being a vertical shaft kiln,
   flowing a bulk material which is not oxidized continuously in a cycle from the top to the bottom of the vertical shaft kiln,
   adding carbon rich substances to the bulk material prior to entrance of the bulk material into the kiln,
   supplying the oxygen containing gas at least in part below the oxidation zone which causes the rising gas to be conveyed upwardly,
   cooling down the bulk material and the ash products to 450° C. in a waste heat zone by the rising gases,
   introducing the oxygen containing gas at least partially at the lower end of the vertical shaft kiln,
   recovering energy by cooling down the bulk material to below 100° C. in a post cooling zone below the waste heat zone in a counterflow, and
   removing the bulk material from the kiln.

2. The method in accordance with claim 1, wherein above the calcination zone the introduced bulk material, together with the carbon-containing substances, is first dried by being heated with the aid of the rising gases in a drying zone to a characteristic temperature of 20 to 100° C., and subsequently is pre-degasified by further heating to a characteristic temperature of 100 to 450° C. in a pre-degasification zone.

3. The method in accordance with claim 1, wherein water is supplied in the waste heat zone, which aids cooling through evaporation, wherein the water vapor being created rises along with the gas flow into the oxidation zone.

4. The method in accordance with claim 1, wherein water is supplied to the oxidation zone.

5. The method in accordance with claim 1, wherein the reaction gases being generated are drawn off at the top of the vertical shaft kiln and are post-treated in a flue stream post-gasification zone at 500° C. to 1,000° C., preferably 600° C. to 800° C., in the presence of water vapor.

6. The method in accordance with claim 5, wherein the thermal energy is made available in the flue stream post-gasification zone by the combustion of a supplied mixture of fuel and stoichiometric or super-stoichiometric oxygen-containing gas.

7. The method in accordance with claim 6, wherein the water vapor is made available in the flue stream post-gasification zone by the addition of water, water vapor, or the water vapor escaping in the drying zone.

8. The method in accordance with claim 1, wherein the bulk material consists, at least in part, of inert mineral, ceramic or metallic material of a grain size of up to 20 cm, preferably 1 to 8 cm.

9. The method in accordance with claim 1, wherein basal calcinates, such as CaO, for example, or pre-stages of the calcinates, are employed as the bulk material, which have a grain size of maximally 20 cm, preferably 1 to 8 cm.

10. The method in accordance with claim 9, wherein a mixture of coarse grain sizes up to 20 cm and of a fine material of a grain size of less than 2 mm is employed as the bulk material.

11. The method in accordance with claim 10, wherein the drawn-off gas is filtered, so that fine material contained in the form of dust in the drawn-off gases is filtered out.

12. The method in accordance with claim 10, wherein the bulk material is filtered for separating the fine material from the bulk material flow.

13. The method in accordance with claim 11, wherein the filtered-out dust is returned wholly or in part to the bulk material cycle.

14. The method in accordance with claim 1, wherein the method is performed in a pressure range between −200 mbar to 1,000 mbar.

15. The method in accordance with claim 14, wherein a slight underpressure is generated in the vertical shaft kiln.

16. The method in accordance with claim 1, wherein the temperature in the oxidation zone is kept below 1,800° C.

17. The method in accordance with claim 1, wherein the vertical shaft kiln has a single chamber, in which the individual process zones are established.

18. The method in accordance with claim 1, wherein the bulk material is moved by gravity through the vertical shaft kiln.

19. The method in accordance with claim 1, wherein, for starting the process, and/or for controlling the position, temperature and size of the zones in the vertical shaft kiln (100), oxygen-containing gas and/or fuel are added in the oxidation zone.

20. The method in accordance with claim 1, wherein plastic waste, bitumen, light shredder fractions, contaminated wood waste, oil-contaminated soil, or the like are employed as carbon-rich substances, and the method is accordingly designed as a disposal method for carbon-containing special waste.

21. The method in accordance with claim 20, wherein materials of edge lengths of up to 40 cm are employed as the carbon-rich substances.

* * * * *